(12) United States Patent
McElhany

(10) Patent No.: US 12,465,016 B2
(45) Date of Patent: Nov. 11, 2025

(54) VACCINATION IDENTIFICATION BUTTON FOR ELECTRONIC IDENTIFICATION BUTTON TAGS TO IDENTIFY CATTLE AS BEING INOCULATED AGAINST BRUCELLOSIS, AND KITS AND METHODS RELATED THERETO

(71) Applicant: Allflex USA LLC, Dallas, TX (US)

(72) Inventor: David McElhany, Dallas, TX (US)

(73) Assignee: Allflex USA LLC, Dallas, TX (US)

( * ) Notice: Subject to any disclaimer, the term of this patent is extended or adjusted under 35 U.S.C. 154(b) by 359 days.

(21) Appl. No.: 17/780,730

(22) PCT Filed: Dec. 15, 2020

(86) PCT No.: PCT/US2020/065032
§ 371 (c)(1),
(2) Date: May 27, 2022

(87) PCT Pub. No.: WO2021/126810
PCT Pub. Date: Jun. 24, 2021

(65) Prior Publication Data
US 2022/0408691 A1 Dec. 29, 2022

Related U.S. Application Data

(60) Provisional application No. 62/950,607, filed on Dec. 19, 2019.

(51) Int. Cl.
*A01K 11/00* (2006.01)
*G06K 19/077* (2006.01)

(52) U.S. Cl.
CPC ...... *A01K 11/004* (2013.01); *G06K 19/07758* (2013.01)

(58) Field of Classification Search
CPC .. A01K 11/001; A01K 11/002; A01K 11/003; A01K 11/004; G06K 19/07758
(Continued)

(56) References Cited

U.S. PATENT DOCUMENTS

| 3,388,492 | A | * | 6/1968 | Nichols, Jr. | .......... | A01K 11/001 |
| | | | | | | 40/301 |
| 4,344,240 | A | | 8/1982 | Schiller | | |

(Continued)

FOREIGN PATENT DOCUMENTS

| CA | 2697088 A1 | 6/2011 |
| CN | 1237887 A | 12/1999 |

(Continued)

OTHER PUBLICATIONS

International Search Report and Written Opinion in International Application No. PCT/US20/65032, mailed Feb. 26, 2021, 16 pages.

(Continued)

*Primary Examiner* — Kathleen S Holwerda
(74) *Attorney, Agent, or Firm* — Keith O'Doherty

(57) ABSTRACT

In one aspect, an EID button tag is provided herein for tagging and identifying cattle as being inoculated against brucellosis, the EID button tag including: a shell having a central opening; a transponder located in the shell; a male punch having a disc-shaped punch body and a stem extending distally therefrom, the stem having a head configured for irreversible insertion into the central opening, wherein a mounting opening is formed through the punch body with a mounting channel extending distally from the mounting opening and coaxially along the stem; and, a vaccination identification button having a disc-shaped visual identification body and a mounting stem extending distally therefrom, wherein the mounting stem is configured for irreversible insertion into the mounting channel. The punch body and the (Continued)

visual identification body are primarily tinted with different colors to provide visual identification of a head of cattle being inoculated against brucellosis.

20 Claims, 4 Drawing Sheets

(58) Field of Classification Search
USPC .................... 606/116, 117; 40/300, 301, 302
See application file for complete search history.

(56) References Cited

U.S. PATENT DOCUMENTS

| | | | | |
|---|---|---|---|---|
| 4,471,546 | A * | 9/1984 | Bolling, Jr. | A01K 11/001 40/302 |
| 6,211,789 | B1 * | 4/2001 | Oldham | A01K 29/00 119/51.02 |
| 7,726,055 | B2 * | 6/2010 | Costantini | B29C 66/1224 343/718 |
| 7,854,079 | B2 | 12/2010 | Hilpert | |
| 10,856,523 | B2 | 12/2020 | Auer | |
| 2003/0182831 | A1 * | 10/2003 | Haar | A01K 11/001 40/301 |
| 2003/0221343 | A1 * | 12/2003 | Volk | A01K 11/004 40/300 |
| 2003/0221344 | A1 | 12/2003 | Volk et al. | |
| 2004/0079010 | A1 | 4/2004 | Crespo | |
| 2008/0047177 | A1 | 2/2008 | Hilpert | |
| 2008/0236001 | A1 * | 10/2008 | Huenefeld | A01K 11/004 40/301 |
| 2008/0250682 | A1 | 10/2008 | Costantini | |
| 2009/0270878 | A1 | 10/2009 | Eadie | |
| 2010/0132233 | A1 | 6/2010 | Hilpert | |
| 2011/0088295 | A1 | 4/2011 | Ibsen | |
| 2011/0202577 | A1 | 8/2011 | Coe | |
| 2014/0060267 | A1 | 3/2014 | Vaamonde et al. | |

FOREIGN PATENT DOCUMENTS

| | | | |
|---|---|---|---|
| CN | 101072499 | A | 11/2007 |
| CN | 201081916 | Y | 7/2008 |
| CN | 101316506 | A | 12/2008 |
| CN | 101677522 | A | 3/2010 |
| DE | 9412262 | U1 | 9/1994 |
| EP | 0166485 | B1 | 4/1991 |
| EP | 2191715 | B1 | 6/2012 |
| GB | 1340743 | A | 1/1974 |
| GB | 1444375 | A | 7/1976 |
| JP | 6119438 | A | 1/1986 |
| JP | 2003235382 | A | 8/2003 |
| JP | 2006503561 | A | 2/2006 |
| JP | 2012-506595 | A | 3/2012 |
| KR | 10-2014-0043755 | A | 4/2014 |
| RU | 10999 | U1 | 9/1999 |
| RU | 2707638 | C2 | 11/2019 |
| WO | 1998022028 | A1 | 5/1998 |
| WO | 2006045162 | A2 | 5/2006 |
| WO | 2010048136 | A1 | 4/2010 |
| WO | 2011007150 | A2 | 1/2011 |
| WO | 2015107354 | A1 | 7/2015 |

OTHER PUBLICATIONS

Office Action received in the counterpart BR Application No. BR112022011842-2, mailed on Jul. 30, 2024, 3 pages.
Office Action received in the counterpart CA Application No. 2,697,088, mailed on Sep. 5, 2023, 6 pages.
1st Examination Report received in the counterpart NZ Application No. 789031, mailed on Mar. 14, 2024, 3 pages.
1st Office Action received in the counterpart CN Application No. 2020800880895, mailed on Mar. 16, 2024, 3 pages.
Extended European Search Report received in the counterpart EP Application No. 20904087.2, mailed on Mar. 22, 2024, 19 pages.
Office Action received in the counterpart JP Application No. 2022-538203, mailed on Jul. 4, 2023, 4 pages.
Official Action and Search Report received in the counterpart RU Application No. 2022119325, mailed on Feb. 17, 2023, 6 pages.
First Examination Report received in the counterpart AU Application No. 2020407164, mailed on May 8, 2023, 3 pages.
International Preliminary Report on Patentability in International Application No. PCT/US20/65032, mailed Jun. 30, 2021, 9 pages.
1 Office Action received in the counterpart MX Application No. MX/a/2022/006796, mailed on Apr. 3, 2025, 8 pages.

* cited by examiner

VACCINATION IDENTIFICATION BUTTON FOR ELECTRONIC IDENTIFICATION BUTTON TAGS TO IDENTIFY CATTLE AS BEING INOCULATED AGAINST BRUCELLOSIS, AND KITS AND METHODS RELATED THERETO

CROSS REFERENCE TO RELATED APPLICATIONS

This application is a national stage application under 35 U.S.C. 371 and claims the benefit of PCT Application No. PCT/US2020/065032 having an international filing date of Dec. 15, 2020, which designates the United States and which claims the benefit of and priority to U.S. Provisional Application No. 62/950,607, filed Dec. 19, 2019. The entire specifications and figures of the above-referenced applications are hereby incorporated, in their entirety by reference herein.

BACKGROUND OF THE INVENTION

Electronic Identification (EID) button tags are known in the prior art for placement on the ears of cattle. The EID button tags are configured to electronically store details relating to the cattle (e.g., identification numbers or identification alphanumeric strings). The stored details may be wirelessly retrieved by an associated reader, using a wireless technology, such as radio frequency identification (RFID). Examples of EID button tags may be found in U.S. Pat. Nos. 7,726,055 and 7,854,079, which are incorporated by reference herein.

Cattle have also been tagged with orange-colored metal ear tags to indicate that the cattle have been inoculated against brucellosis. These metal tags are plate-shaped and are provided separately from any EID button tags.

SUMMARY OF THE INVENTION

In one aspect, an EID button tag is provided herein for tagging and identifying cattle as being inoculated against brucellosis, the EID button tag including: a shell having a central opening; a transponder located in the shell; a male punch having a disc-shaped punch body and a stem extending distally therefrom, the stem having a head at the terminus thereof configured for irreversible insertion into the central opening, wherein a mounting opening is formed through the punch body with a mounting channel extending distally from the mounting opening and coaxially along the stem; and, a vaccination identification button having a disc-shaped visual identification body and a mounting stem extending distally therefrom, wherein the mounting stem is configured for irreversible insertion into the mounting channel. The punch body is primarily tinted with a first color, the visual identification body is primarily tinted with a second color, the first and second colors being different, whereby, the visual identification body provides visual identification of a head of cattle being inoculated against brucellosis. Advantageously, the EID button tag is fully enabled as an EID device and provides for visual indication of inoculation against brucellosis, thereby eliminating the need to tag cattle with multiple tags.

In a further aspect, a kit is provided herein including an EID button tag, as described above in the preceding paragraph, along with a tubular applicator having a first open end with an inner diameter formed to closely receive the visual identification body with the mounting stem extending outwardly therefrom, and a reduced diameter portion adjacent to the first open to limit insertion of the visual identification body into the tubular applicator.

In another aspect, a kit is provided herein to update an electronic identification (EID) button tag tagged to a head of cattle to identify the head of cattle as being inoculated against brucellosis, the EID button tag including a mounting opening with a mounting channel extending therefrom, the kit including: a vaccination identification button having a disc-shaped visual identification body and a mounting stem extending distally therefrom, wherein the mounting stem is configured for irreversible insertion into the mounting channel; and, a tubular applicator having a first open end with an inner diameter formed to closely receive the visual identification body with the mounting stem extending outwardly therefrom, and a reduced diameter portion adjacent to the first open end to limit insertion of the visual identification body into the tubular applicator.

In yet a further aspect, a method is provided herein of tagging cattle to identify cattle as being inoculated against brucellosis, the cattle being each tagged with an EID button tag, the method including: providing a vaccination identification button having a disc-shaped visual identification body; identifying a head of cattle as being inoculated against brucellosis; and, securing the vaccination identification body to the EID button tag of the identified head of cattle to be visually perceptible from a location along the identified head of cattle, wherein, the EID button tag is primarily tinted with a first color, the visual identification body is primarily tinted with a second color, the first and second colors being different.

These and other features of the invention will be better understood through a study of the following detailed description and accompanying drawings.

DETAILED DESCRIPTION OF THE INVENTION

The subject invention is directed to a vaccination identification button useable with EID button tags to identify cattle inoculated against brucellosis. Embodiments of an EID button tag are described herein which are useable with the subject invention. As will be recognized by those skilled in the art, the subject invention may be used with any EID button tag, consistent with the disclosure herein. In this manner, the subject invention may be provided: with a new EID button tag, ready for tagging; as a kit with an applicator to install on a new EID button tag or to update an already mounted EID button tag; or, as a stand-alone item to install on a new EID button tag or to update an already mounted EID button tag.

Figure 1:
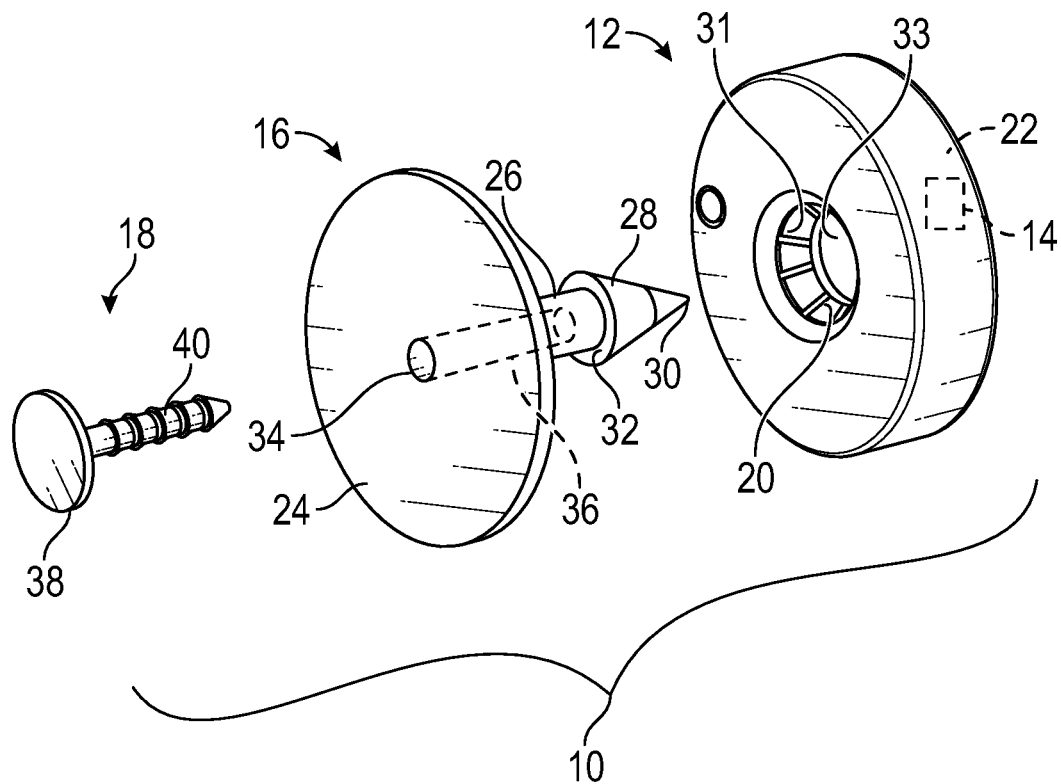
FIGS. 1 and 2 show an EID button tag formed in accordance with the subject invention.
Figure 2:
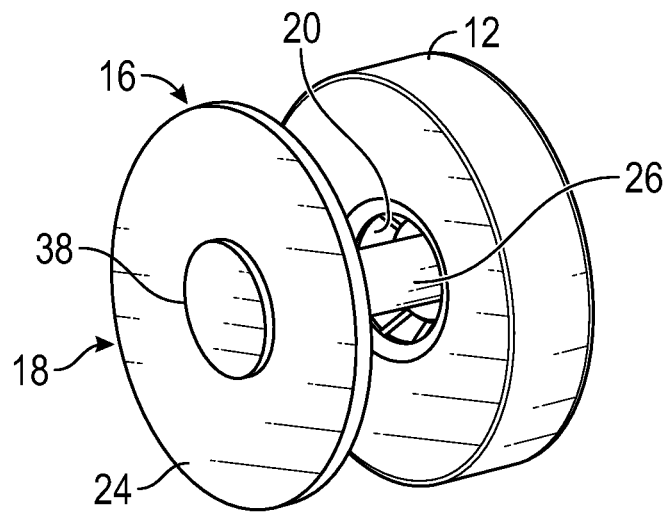

With reference to FIGS. 1 and 2, an EID button tag is shown generally designated by reference number 10. The EID button tag 10 generally includes a shell 12, a transponder 14 located in the shell 12, and, a male punch 16. A vaccination identification button 18 is provided for mounting to the EID button tag 10. As discussed below, the vaccination identification button 18 is mountable to the male punch 16 to provide a visual indication that a head of cattle has been inoculated against brucellosis.

The shell 12 is a disc-shaped body having a central opening 20 passing therethrough. The shell 12 includes at least one internal hollow chamber 22. Preferably, the shell 12 includes at least one removable part or section to allow access to the hollow chamber 22.

The transponder 14 may be of any known type to store information which is wirelessly retrievable. The transponder 14 may have a receiver and/or transmitter to facilitate receipt or transmission of wireless signals. The transponder 14, also may include an associated non-transitory memory, (e.g., an EEPROM) which may be readable/writable, to electronically store details of an associated head of cattle. Any wireless technology, such as RFID, Bluetooth, cellular, and so forth, may be used to access the stored information of the transponder 14.

The transponder 14 is located inside the shell 12, e.g., inside the hollow chamber 22, preferably with a source of power, such as a battery. The shell 12 is preferably liquid-tight to minimize ingress of moisture into the shell 12. Any seal arrangement may be provided at any interfaces between parts or sections of the shell 12 to resist ingress of moisture.

The male punch 16 includes a disc-shaped punch body 24 and a stem 26 extending distally therefrom. The stem 26 includes a head 28 at a terminus 30 thereof, the head 28 being configured for irreversible insertion into the central opening 20 of the shell 12. The shell 12 may include a rib or other inwardly protruding element about the central opening 20 which is by-passable by the head 28 with insertion, but restricts reverse movement due to interference. In addition, or alternatively, the central opening 20 may be bounded by frustoconically shaped wall 31, converging distally to a reduced-diameter end 33. The head 28 may be inserted through the central opening 20 with the distal reduced-diameter end 33 of the central opening 20 acting to restrict reverse movement. The head 28, as shown in FIG. 1, may have a tapered shape, terminating proximally at an annular shoulder 32. The interengagement of the shoulder 32 against the rib or protruding element about the central opening 20, and/or against the distal reduced-diameter end 33 of the central opening 20, may act to restrict reverse movement of the stem 26 relative to the shell 12.

As shown in FIG. 2, it is preferred that a gap be defined between the punch body 24 and the shell 12 with the stem 26 being irreversibly inserted into the central opening 20. This gap is to accommodate the ear of a head of cattle. To mount the EID button tag 10 to a head of cattle, a hole is punched through the animal's ear. The stem 26, with the head 28 leading, is inserted through the punched hole and into the central opening 20 of the shell 12. The interengagement of the stem 26 with the shell 12 retains the EID button tag 10 on the animal's ear with the punch body 24 and the shell 12 being on opposite sides of the animal's ear.

A mounting opening 34 is formed through the punch body 24 with a mounting channel 36 extending distally from the mounting opening 34 and coaxially along the stem 26. The mounting channel 36 may be formed to receive an applicator pin of a hand-operated tagger, such as that sold under the name "Universal Total Tagger," by Allflex USA, Inc. of Dallas, Texas.

The vaccination identification button 18 includes a disc-shaped visual identification body 38 and a mounting stem 40 extending distally therefrom. The mounting stem 40 is configured for insertion into the mounting channel 36, preferably, configured for irreversible insertion into the mounting channel 36. FIG. 2 shows the vaccination identification button 18 being mounted to the punch body 24 with the mounting stem 40 being received in the mounting channel 36. With irreversible insertion, removal of the vaccination identification button 18 from the punch body 24 is restricted.

The mounting of the vaccination identification button 18 to the punch body 24 provides visual indication that a head of cattle has been inoculated against brucellosis. Thus, a head of cattle tagged with the EID button tag 10 may be updated with the vaccination identification button 18 to indicate inoculation against brucellosis, avoiding the need for separate tagging.

To enhance visual perception of the vaccination identification button 18, the punch body 24 may be primarily tinted with a first color, and the visual identification body 38 may be primarily tinted with a second color, different from the first color. The first and/or second color may be any of the basic colors of the color spectrum, including, but not limited to: black, white, red, orange, yellow, green, blue, indigo, and violet. The first and/or second color may also be any color which is a combination of the basic colors of the color spectrum, such as brown, tan, gray, silver, and so forth. In addition, the first and second colors may be of the same basic color, or a combination of basic colors, but of different shades, particularly visually distinguishable shades, such as dark blue versus light blue.

The second color may be orange providing the visual identification body 38 with a recognizable color, based on prior art orange-colored tags, indicating brucellosis inoculation. The first color may be white or yellow to provide contrast to the second color of orange.

As used herein, reference to being "primarily tinted" means that the tinting covers at least the majority of the related surfaces. Other tinting may be present. For example, the visual identification body 38 may be primarily tinted with the second color as orange with black lettering, or other indicia, also provided on the visual identification body 38, providing additional information. Likewise, indicia, tinted differently from the first color as the primary tint, may be provided on the punch body 24.

The mounting of the visual identification body 38 to the punch body 24 allows for visual perception of an observer located along a head of cattle to determine whether the animal is inoculated against brucellosis. With the outward facing surfaces of the punch body 24 and the visual identification body 38 being viewable, forward facing or rearward facing arrangements on the animal's ear are both permitted.

Figure 3:
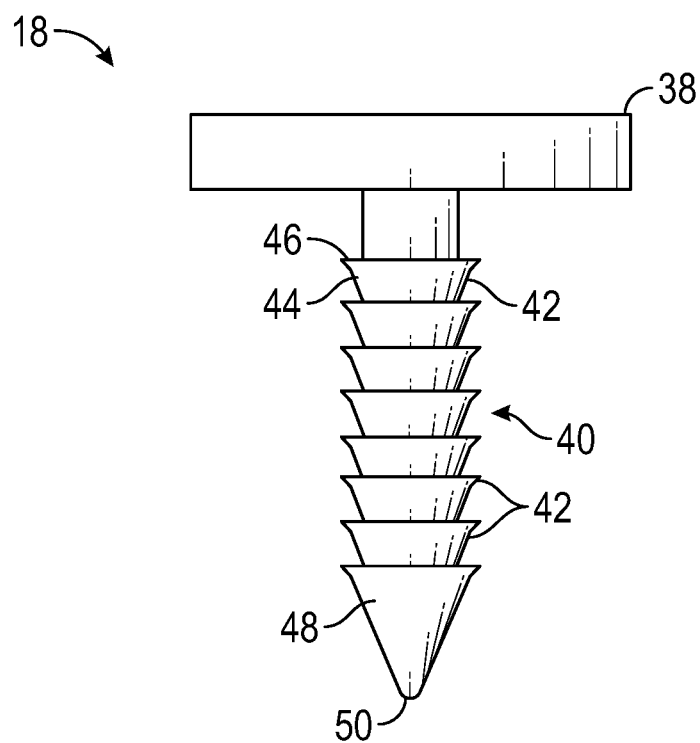
FIG. 3 shows a vaccination identification button formed in accordance with the subject invention; and, FIGS. 4-8 show an applicator useable with the subject invention.
Figure 4:
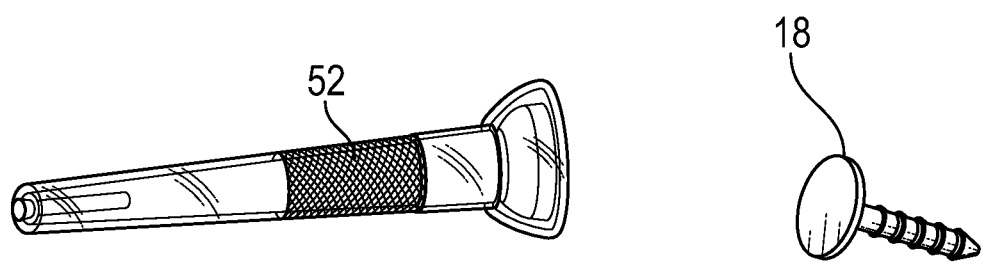

With reference to FIG. 3, the mounting stem 40 of the vaccination identification button 18 may be provided with at least one protruding rib 42. The at least one protruding rib 42 may extend circumferentially about the mounting stem 40. In addition, the at least one protruding rib 42 may be Belleville-washer shaped extending proximally from an inner edge 44 bounding the mounting stem 40 to an outer free edge 46. A tapered end 48 may be provided at a distal terminus 50 of the mounting stem 40. A plurality of the ribs 42 may be located along the mounting stem 40 proximally of the tapered end 48. The at least one protruding rib 42 and/or the tapered end 48 may be formed with sufficient diameter to interferingly engage the wall of the mounting channel 36, thus providing resistance to removal of the vaccination identification button 18 once mounted to the male punch 16. The tapered shape of both the at least one protruding rib 42 and the tapered end 48 provide additional resistance against reverse movement.

The shell 12, the male punch 16, and the vaccination identification button 18 are preferably each formed of a polymeric material and sufficiently robust to withstand use with cattle in harsh environmental conditions.

Figure 5:
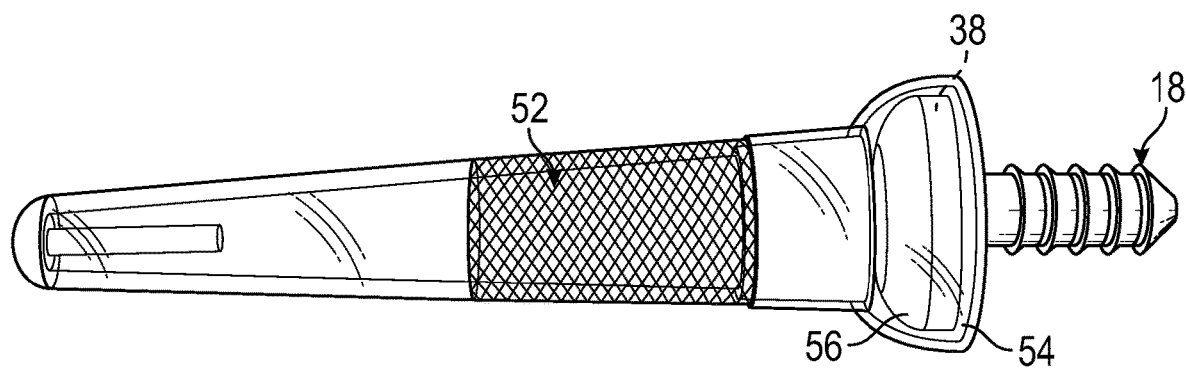
Figure 6:
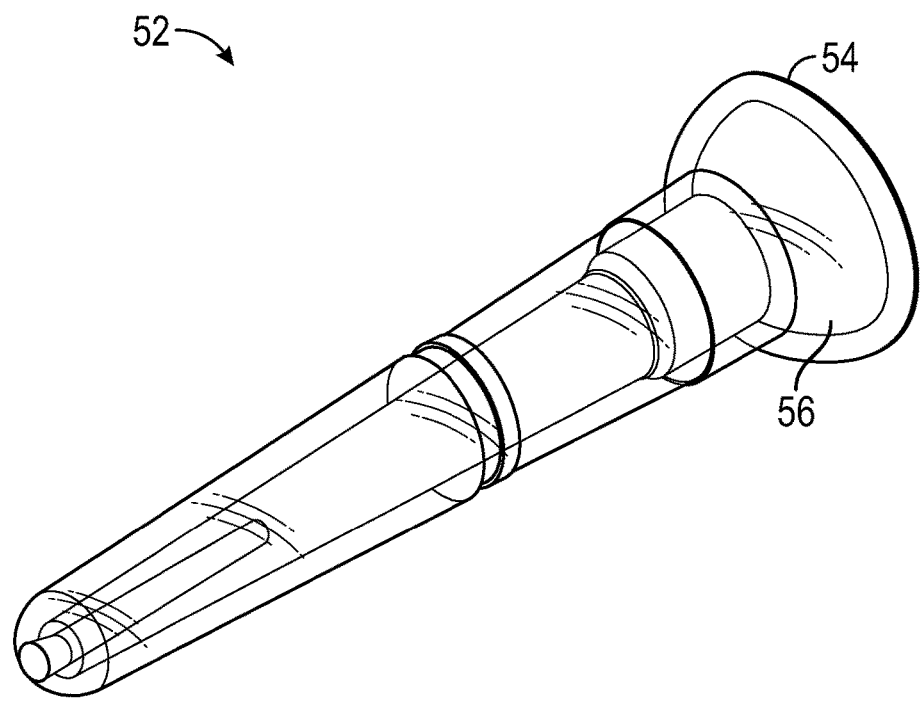
Figure 7:
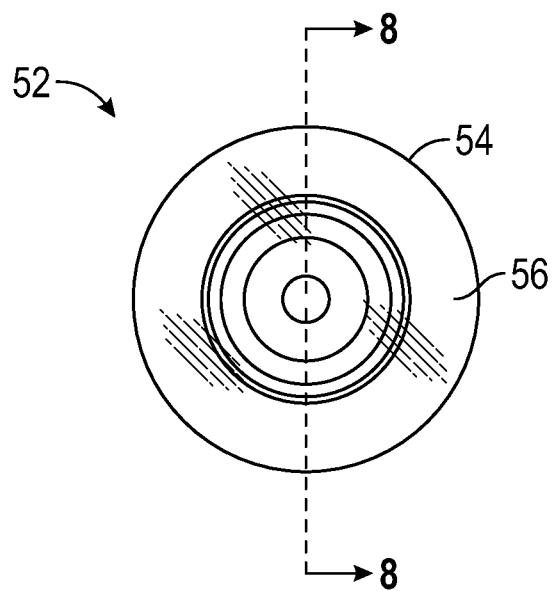
Figure 8:
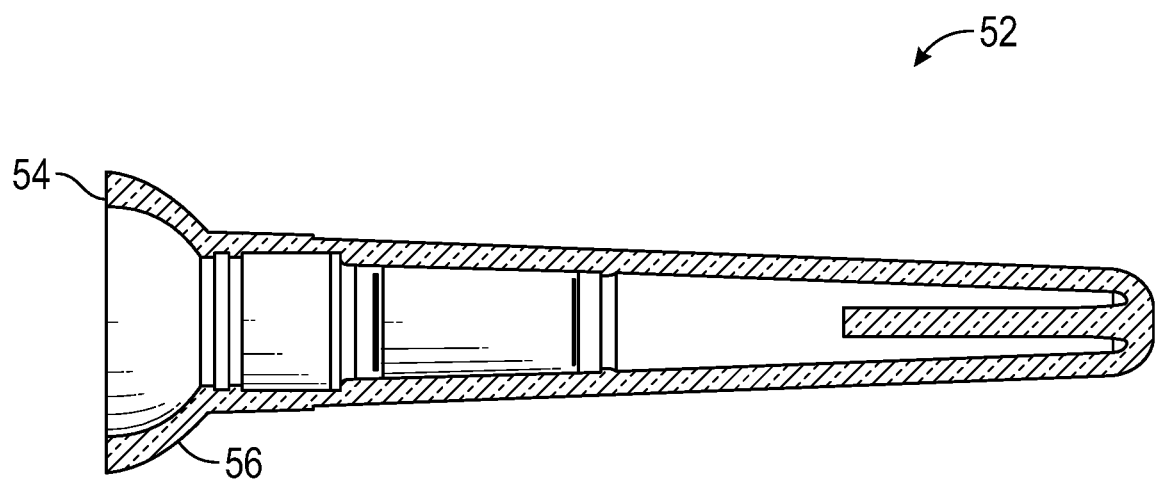

To facilitate mounting of the vaccination identification button 18 to the male punch 16, a tubular applicator 52 may be used, as shown in FIGS. 4-8. The tubular applicator 52 includes a first open end 54 with an inner diameter formed to closely receive the visual identification body 38 with the mounting stem 40 extending outwardly therefrom, as shown in FIG. 5. A reduced diameter portion 56 is located adjacent to the first open end 54 formed to limit insertion of the visual identification body 38 into the tubular applicator 52. With the visual identification body 38 received in the first open end 54, as shown in FIG. 5, the tubular applicator 52 may act as a handle in manipulating the vaccination identification button 18, particularly in mounting the vaccination identification button 18 to the male punch 16.

In use, the subject invention may be used to tag cattle to identify cattle as being inoculated against brucellosis. The cattle are each tagged with an EID button tag, which may be formed in accordance with the EID button tag 10 described above, or of a different design. With a head of cattle identified as being inoculated against brucellosis, the vaccination identification button 18 may be secured to the EID button tag of the identified head of cattle to be visually perceptible from a location along the identified head of cattle. The EID button tag may be primarily tinted with the first color, and, the visual identification body 38 of the vaccination identification button 18 may be primarily tinted with the second color, different from the first color, as discussed above.

Alternatively, an electronic identification (EID) button tag tagged to a head of cattle to can used to identify the head of cattle as being inoculated against a wide variety of diseases. Nonlimiting examples are Akabane, Anthrax (*Bacillus anthracis*0, African Swine Fever, Bovine tuberculosis (*Mycobacterium bovis*), Bluetongue (serotype 8), Brucellosis (*Brucella abortus*), Brucellosis (*Brucella melitensis*), Brucellosis (*Brucella suis*), Bovine spongiform encephalopathy, Crimean-Congo hemorrhagic fever, Chronic Wasting Disease, Classical swine fever, Corona Virus, Epizootic hemorrhagic disease, Bluetongue (serotypes other than 8), *Echinococcosis*/hydatidosis (*Echinococcosis granulosis, E. multilocularis*), Paratuberculosis (Johne's disease) (*Mycobacterium avium paratuberculosis*), Q fever (*Coxiella burnetii*), Tularemia (*Francisella tularensis*), Foot-and-mouth disease, Glanders (*Burkholderia mallei*), Heartwater (*Cowdria ruminantium*), Japanese encephalitis, Melioidosis (*Burkholderia pseudomallei*), New World screwworm (*Cochliomyia hominivorax*), Old World screwworm (*Chrysomya bezziana*), Pseudorabies (Aujesky's disease), Rabies, Rift Valley fever, Rinderpest, Scrapie, Surra (*Trypanosoma evansi*), Trichomoniasis (*Tritrichomonas foetus*), Trichinellosis (*Trichinella* spp.), Vesicular stomatitis. Further the EID button could be used as a visual identification for any future emerging virus/disease identified by the United States Department of Agriculture or other government agencies.

What is claimed is:

1. An electronic identification (EID) button tag for tagging and identifying an animal, the EID tag comprising:
    a shell having a central opening;
    a transponder located in the shell;
    a male punch having a disc-shaped punch body and a stem extending distally therefrom, the stem having a head at the terminus thereof configured for irreversible insertion into the central opening, wherein a mounting opening is formed through the punch body with a mounting channel extending distally from the mounting opening and coaxially along the stem; and,
    a vaccination identification button having a disc-shaped visual identification body and a mounting stem extending distally therefrom, wherein the mounting stem is configured for irreversible insertion into the mounting channel,
    wherein, the punch body is primarily tinted with a first color, the visual identification body is primarily tinted with a second color, the first and second colors being different, whereby, the visual identification body provides visual identification of the animal being inoculated against a disease.

2. An EID button tag as in claim 1, wherein the first and second colors are different basic colors or combinations thereof.

3. An EID button tag as in claim 1, wherein the first and second colors are different shades of the same basic color or combinations thereof.

4. An EID button tag as in claim 1, wherein the second color is orange.

5. An EID button tag as in claim 1, wherein the mounting stem includes at least one protruding rib.

6. An EID button tag as in claim 5, wherein the at least one protruding rib extends circumferentially about the mounting stem.

7. An EID button tag as in claim 5, wherein the at least one protruding rib is Belleville-washer shaped extending proximally from an inner edge bounding the mounting stem to an outer free edge.

8. An EID button tag as in claim 7, wherein the mounting stem terminates distally at a tapered end, and, wherein a plurality of protruding ribs are located along the mounting stem proximally of the tapered end.

9. A kit comprising:
    an EID button tag as set forth in claim 1; and,
    a tubular applicator having a first open end with an inner diameter formed to closely receive the visual identification body with the mounting stem extending outwardly therefrom, and a reduced diameter portion adjacent to the first open end to limit insertion of the visual identification body into the tubular applicator.

10. A kit to update an electronic identification (EID) button tag tagged to an animal as being inoculated against disease, the EID button tag including a mounting opening with a mounting channel extending therefrom, the kit comprising:
    a vaccination identification button having a disc-shaped visual identification body and a mounting stem extending distally therefrom, wherein the mounting stem is configured for irreversible insertion into the mounting channel; and,
    a tubular applicator having a first open end with an inner diameter formed to closely receive the visual identification body with the mounting stem extending outwardly therefrom, and a reduced diameter portion adjacent to the first open end to limit insertion of the visual identification body into the tubular applicator.

11. A kit as in claim 10, wherein the mounting stem includes at least one protruding rib.

12. A kit as in claim 11, wherein the at least one protruding rib extends circumferentially about the mounting stem.

13. A kit as in claim 11, wherein the at least one protruding rib is Belleville-washer shaped extending proximally from an inner edge bounding the mounting stem to an outer free edge.

14. A kit as in claim 13, wherein the mounting stem terminates distally at a tapered end, and, wherein a plurality of protruding ribs are located along the mounting stem proximally of the tapered end.

15. A method of tagging an animal to identify the animal as being inoculated against disease, the animal being tagged with an electronic identification (EID) button tag, the method comprising:
   providing the EID button tag including a shell with a hollow chamber surrounding a central opening, a male punch having a punch body and a stem extending distally therefrom, the stem having a head at the terminus thereof and the head communicating with the central opening, wherein a mounting opening is formed through the punch body with a mounting channel extending distally from the mounting opening and coaxially along the stem;
   providing a vaccination identification button having a visual identification body and a mounting stem wherein the mounting stem is received in the mounting channel;
   identifying the animal as being inoculated against the disease; and
   securing the vaccination identification button to the EID button tag of the identified animal to be visually perceptible from a location along the identified animal.

16. A method as in claim 15, wherein the EID button tag is primarily tinted with a first color, the visual identification body is primarily tinted with a second color, the first and second colors being different.

17. A method as in claim 16, wherein the first and second colors are different shades of the same basic color or combinations thereof.

18. A method as in claim 16, wherein the second color is orange.

19. A method as in claim 15, wherein:
   a transponder is located in the hollow chamber of the shell.

20. An identification tag for tagging and identifying an animal comprising:
   a shell having a central opening;
      a male punch having a punch body and a stem extending distally therefrom, the stem having a head at the terminus thereof configured for irreversible insertion into the central opening, wherein a mounting opening is formed through the punch body with a mounting channel extending distally from the mounting opening and coaxially along the stem;
      a vaccination identification button having a visual identification body and a mounting stem, wherein the mounting stem is configured for irreversible insertion into the mounting channel; and
   wherein, the identification tag includes two different colors thereon to provide visual identification of an animal being inoculated against disease.

* * * * *